United States Patent [19]
Boyd et al.

[11] Patent Number: 5,843,487
[45] Date of Patent: Dec. 1, 1998

[54] MODULAR INJECTION MOLDING MACHINE

[75] Inventors: Thomas J. Boyd, Akron; Robert L. Brown, Hartville, both of Ohio

[73] Assignee: MTI (Manufacturing Technologies International Corp.), Uniontown, Ohio

[21] Appl. No.: 926,306

[22] Filed: Sep. 5, 1997

[51] Int. Cl.⁶ .................................................. B29C 45/10
[52] U.S. Cl. ...................... 425/190; 425/192; 425/450.1; 425/451.9; 425/589
[58] Field of Search .................................... 425/182, 190, 425/192 R, 450.1, 451.9, 589, 595

[56] References Cited

U.S. PATENT DOCUMENTS

| | | | |
|---|---|---|---|
| 4,680,002 | 7/1987 | Hehl | 425/190 |
| 5,474,438 | 12/1995 | Walker, Jr. | 425/190 |
| 5,562,935 | 10/1996 | Martin | 425/190 |

*Primary Examiner*—Tim Heitbrink

[57] ABSTRACT

A modular injection molding machine has an extruder/injector assembly, a carriage assembly for carrying the extruder/injector assembly, a first clamping apparatus for holding an associated first mold, a main frame assembly which supports the first clamping apparatus and, a first adder module assembly. The first adder module assembly is selectively operatively connectable to the main frame assembly and is used to support a second clamping apparatus at any selectable laterally spaced distance. The carriage assembly selectively carries the extruder/injector assembly between the first and second clamping apparatuses. The preferred clamping apparatus has a first clamp assembly which is rigidly connected to an associated support member, a second clamp assembly which is movably connected to the first clamp assembly, a lower platen assembly which is operatively connected to the first clamp assembly, an upper platen assembly which is operatively connected to the second clamp assembly and, a moving device for selectively moving the second clamp assembly. The first and second clamp assemblies form a collapsible C frame support structure. To add an adder module to a modular injection molding machine, first a base plate is positioned at any selectable laterally spaced distance from a bottom plate. Next, a front plate is placed on a front shelf on the base plate. A back key is then installed, being received within a back key slot on the bottom plate and within a back key slot on the base plate. After that, a tie bar is connected to the bottom plate, the first plate, the base plate and the front plate. A front key is then installed, being received within the key slot of the first plate and within a key slot of the front plate. Finally, a second clamping apparatus is connected to the front plate.

26 Claims, 17 Drawing Sheets

MODULAR INJECTION MOLDING MACHINE

BACKGROUND OF THE INVENTION

1. Field of Invention

This invention pertains to the art of methods and apparatuses for injection molding, and more specifically to methods and apparatuses for a modular injection molding machine.

2. Description of the Related Art

Injection molding machines are commonly used in the manufacturing industry. They use a clamping apparatus to hold a mold closed during injection and an extruder/injector to fill a cavity in the mold with an elastomeric material such as rubber or plastic. Typically the elastomeric material is then cured before it is removed from the mold so sometimes these machines are known as presses. There are two main types of clamping apparatuses currently on the market. The first type uses a C frame structure to carry the load which is generated in the closing or opening of the clamp. The second type uses posts or a frame in which the load is located on the same plane with the axis of the frame. A commonly known example of this is a four post press which has the clamp load located in the center of the four posts.

A common problem often encountered in the art deals with the need to expand an existing injection molding machine by adding another clamping apparatus. Typically, an entire new machine must be purchased. Modular machines are available but they only provide room in precise and predetermined locations for the addition of another clamping apparatus. These options are expensive and inflexible.

A problem in the art with the post clamping apparatus is that the posts increase the width of the machine and also requires additional floor space. This limits the minimum center to center distance of an adjacent clamping apparatus. If a part is required with molding at two or more distinct sections, the presses might not be able to be located sufficiently close to each other. This requirement is known in the automotive door seal industry where one part is molded to a second part which is then molded to a third part. One known solution to this problem is to purchase and use a larger press so that both moldings can be accomplished at once. Another known solution is to make the moldings one at a time. The first solution is quite expensive and the second solution increases inventory, material handling costs and production time due to the transporting requirements.

Another problem with the post clamping apparatus is limited mold accessibility. A post clamping apparatus has, at the most, two completely accessible sides (a two post press).

A problem in the art with the C frame clamping apparatus is the relatively large bending load felt by the C frame. This bending load is a function of the distance between the tips of the "C."

Another problem encountered in the art with both types of clamping apparatuses deals with the common use of a shuttle which moves molds in and out of the press. Typically, a shuttle requires a complex and relatively expensive system of interlocks and motion devices.

Another problem with shuttles is as follows. Typically, on a shuttle press one part is being made (injected and/or cured) in one mold while another part is being loaded or unloaded into a second mold. The problem occurs when the load/unload time of the second mold is less than the injection/curing time of the first mold. When this occurs the operator is not being used at full potential because the operator must wait for the completion of the injection/curing stage of the first mold. The only known solution to improve the productivity of the operator is to purchase a second machine for the operator to operate concurrently. This solution is expensive and typically means that the operator will have a relatively long distance to travel between the two machines.

Still another problem known in the art is that the extruder/injector is often underutilized. After one part has been injected into the mold cavity, if the extruder/injector cannot immediately begin injecting another part it remains idle, wasting the relatively large investment put into it (typically the extruder/injector cost will be about 30% of the total machine cost).

The present invention provides methods and apparatuses for eliminating or reducing these problems. The difficulties inherent in the art are therefore overcome in a way which is simple and efficient, while providing better and more advantageous results.

SUMMARY OF THE INVENTION

In accordance with one aspect of the invention there is provided a modular injection molding machine which has an extruder/injector assembly, a carriage assembly for carrying the extruder/injector assembly, a first clamping apparatus for holding an associated first mold, a main frame assembly which supports the first clamping apparatus and, a first adder module assembly. The first adder module assembly is selectively operatively connectable to the main frame assembly and is used to support a second clamping apparatus at any selectable laterally spaced distance. The carriage assembly selectively carries the extruder/injector assembly between the first and second clamping apparatuses.

In accordance with another aspect of the invention there is provided a clamping apparatus. The clamping apparatus has a first clamp assembly which is rigidly connected to an associated support member, a second clamp assembly which is movably connected to the first clamp assembly, a lower platen assembly which is operatively connected to the first clamp assembly, an upper platen assembly which is operatively connected to the second clamp assembly and, moving means for selectively moving the second clamp assembly. The first and second clamp assemblies form a collapsible C frame support structure.

In accordance with another aspect of the invention there is provided a method for adding an adder module to a modular injection molding machine. The modular injection molding machine has an extruder/injector assembly, a carriage assembly for carrying the extruder/injector assembly, a first clamping apparatus for holding an associated first mold and a main frame assembly which supports the first clamping apparatus. The main frame has a bottom plate with a back key slot and a first plate with a key slot. First, a base plate is positioned at any selectable laterally spaced distance from the bottom plate. Next, a front plate is placed on a front shelf on the base plate. A back key is then installed, being received within the back key slot on the bottom plate and within a back key slot on the base plate. After that, a tie bar is connected to the bottom plate, the first plate, the base plate and the front plate. A front key is then installed, being received within the key slot of the first plate and within a key slot of the front plate. Finally, a second clamping apparatus is connected to the front plate.

One advantage of the invention is that an adder module can be added with relative ease and at any selectable laterally spaced distance from the main frame of the modular injection molding machine.

Another advantage of the invention is that clamping apparatuses have the smallest possible center to center distance between them. This makes it relatively easy to mold a part requiring two or more moldings.

Another advantage of the invention is that mold accessibility is maximized. The clamping apparatus provides three open sides from which the molds can be reached by an operator.

Another advantage of the present invention is that the bending load placed on the frame of the clamping apparatus is minimized. This occurs because the frame herein utilized is a collapsible C frame which provides a relatively small distance between the tips of the "C" during clamping loads.

Another advantage of the invention is that it permits the operator to be very productive without the purchase of another machine. If the load/unload time of a first mold is less than the injection/curing time of a second mold the operator simply moves to the next, relatively close, clamping apparatus once the first mold is completed.

Still another advantage of the invention is that the extruder/injector use is maximized. With a plurality of clamping apparatuses, after one part has been injected into a mold cavity the extruder/injector moves to the next clamping apparatus and begins injecting a second part relatively quickly.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
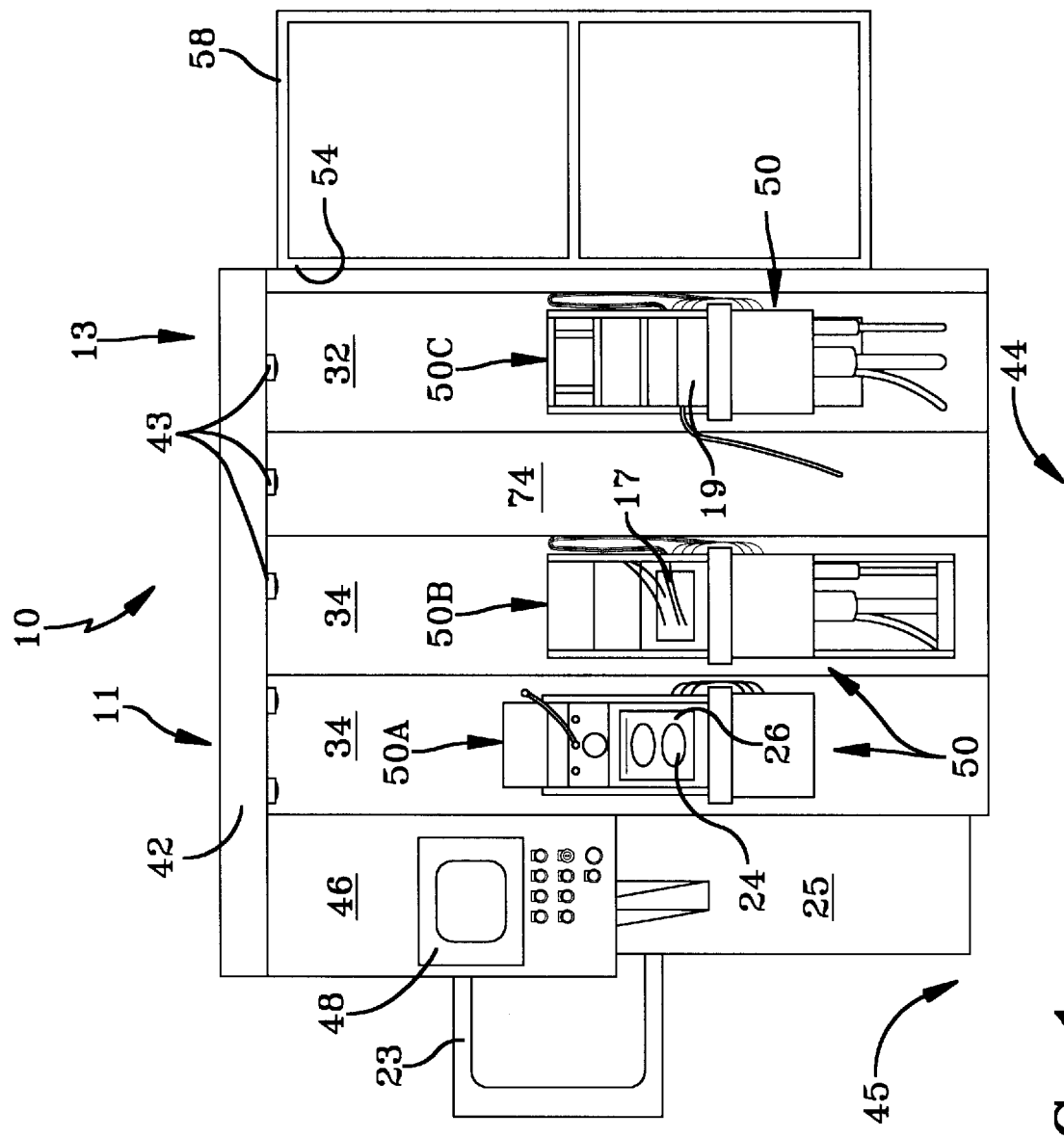
FIG. 1 is a front view of the modular injection molding machine of this invention showing the basic unit assembly and the first adder module.

Referring now to the drawings wherein the showings are for purposes of illustrating a preferred embodiment of the invention only and not for purposes of limiting the same, FIGS. 1–5 show a modular injection molding machine 10. The modular injection molding machine 10 can be thought of as comprising two major components, a basic unit assembly 11 and a first adder module assembly 13 as will be discussed further below. The basic unit assembly 11 has an extruder/injector assembly 12 which comprises, as best seen in FIG. 6, an extruder 14 and an injector 16. Referring to FIGS. 1–6, the extruder 14 takes a material 18 and extrudes, heats up, and transfers it to the transfer region 20 of the extruder/injector assembly 12. In the injection chamber 63 the material 18 is compressed by a piston 22 and forced into the mold cavity 24 of a mold such as first mold 26. The extruder/injector assembly 12 is designed to be able to be used with any number of clamping apparatuses. Since the workings of extruders and injectors is common knowledge in the art, no further detailed discussion will be made. Any extruder/injector assembly chosen with sound engineering judgement could be used in this invention. Likewise, though the material 18 used in this preferred embodiment is rubber, other materials chosen with sound engineering judgement could also be used. The material 18 is loaded onto a reel 21 from a second operator area 45. The reel 21 remains with the extruder/injector assembly 12 and is loaded through a safety door 23 through an opening 29 in the electric panel 25. When the safety door 23 is opened, the modular injection molding machine 10 is switched into an operator safe condition as it commonly known in the art until the safety door 23 is closed again. The modular injection molding machine 10 in this embodiment also has three similar clamping apparatuses 50 shown as first, second and third clamping apparatuses 50a, 50b, 50c. Each clamping apparatus 50 is for holding an associated mold. First, second and third clamping apparatuses 50a, 50b, 50c for example, hold respectively first, second and third molds 26, 17 and 19. The first and second clamping apparatuses 50a, 50b are rigidly attached to the first plates 34 of the basic unit assembly 11 and the third clamping apparatus 50c is rigidly attached to the front plate 32 of the first adder module 13. A preferred clamping apparatus 50 will be discussed below but it should be noted that any clamping apparatus chosen with sound engineering judgement can be used in this invention.

Figure 3:
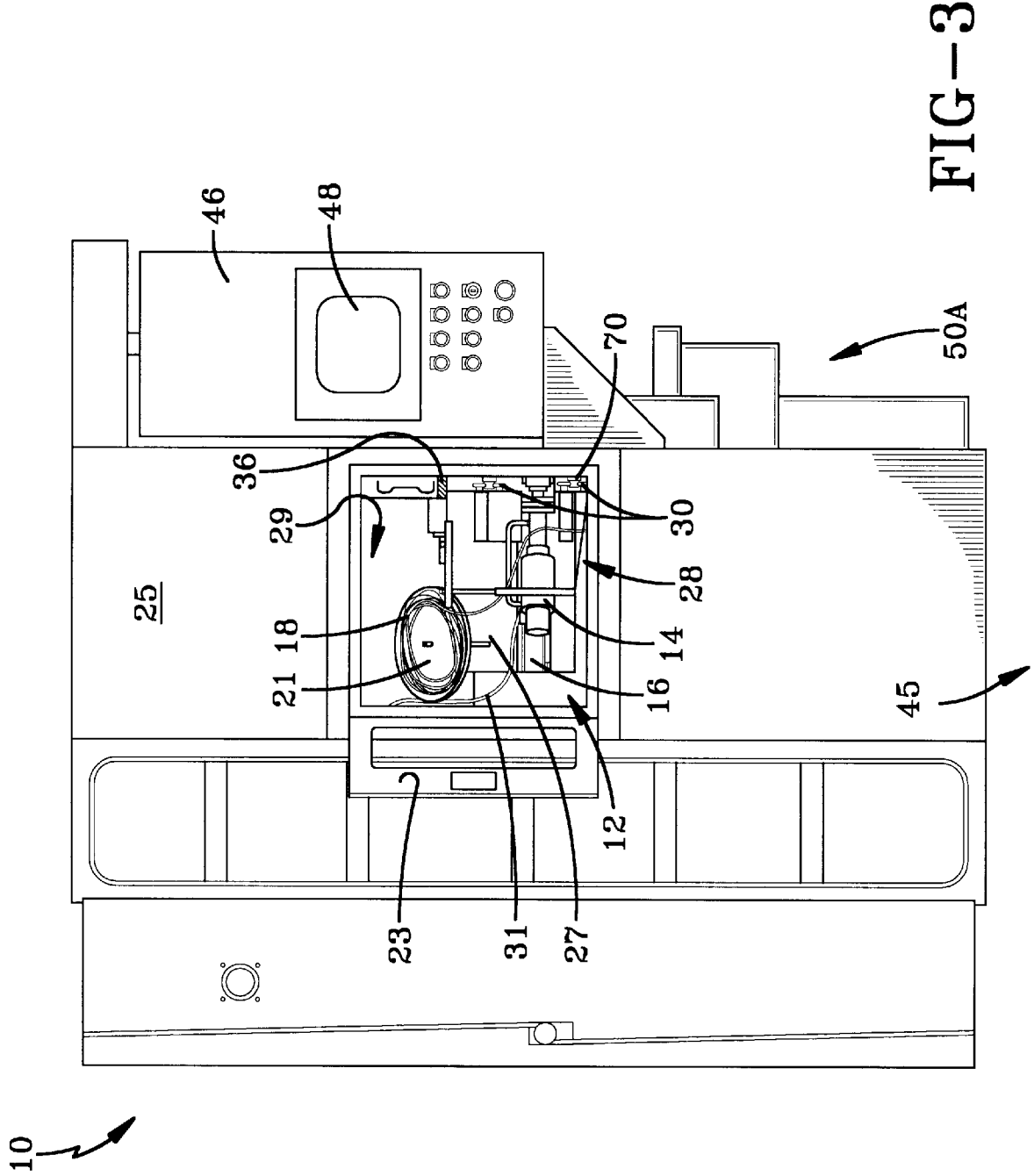
FIG. 3 is a left side view showing the opening in the electric panel through which the reel is loaded.
Figure 4:
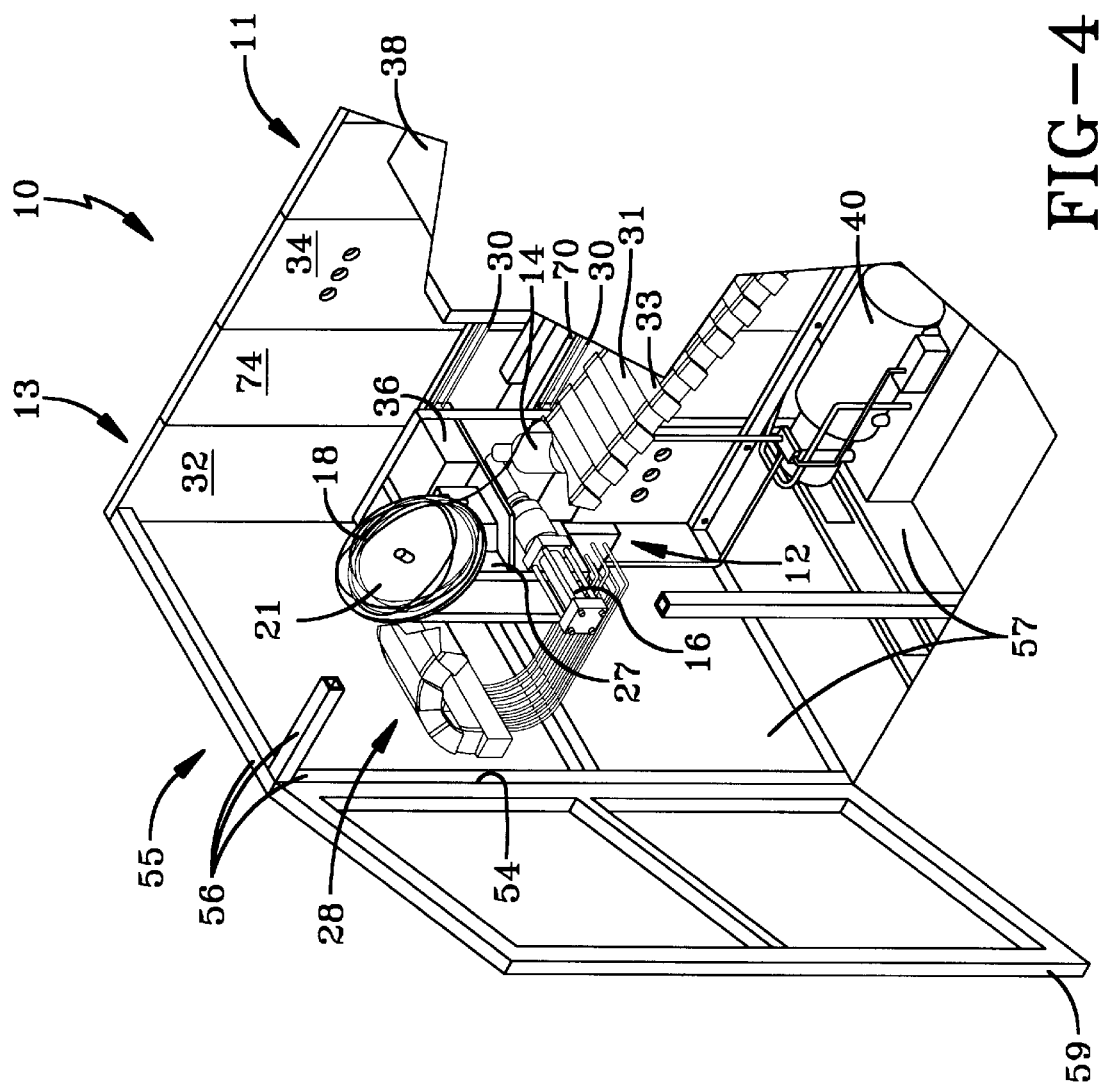
FIG. 4 is a back view showing the extruder/injector assembly.
Figure 5:
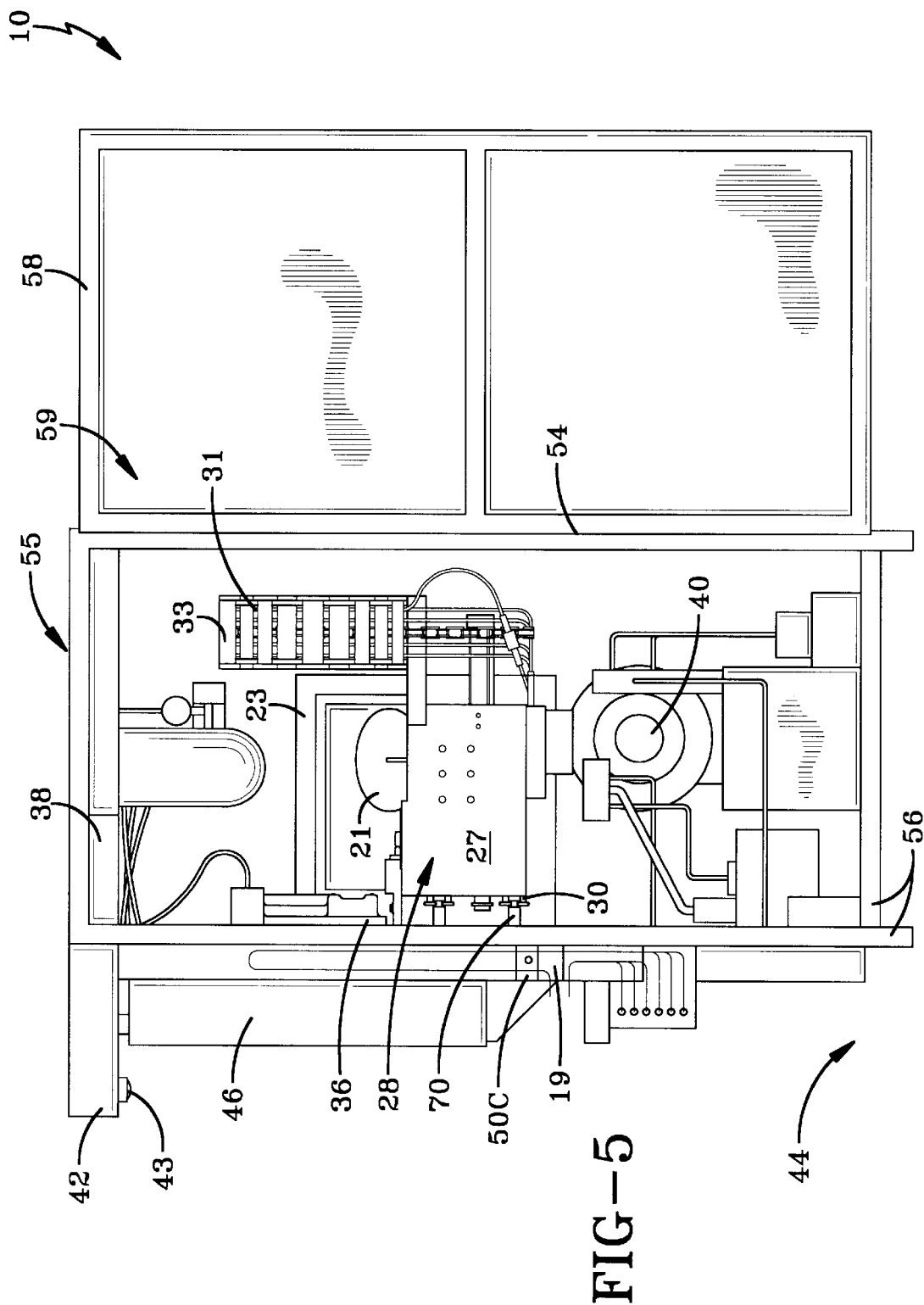
FIG. 5 is a right side view showing the overhang of the electric panel and the support plate used to support the carriage assembly.
Figure 6:
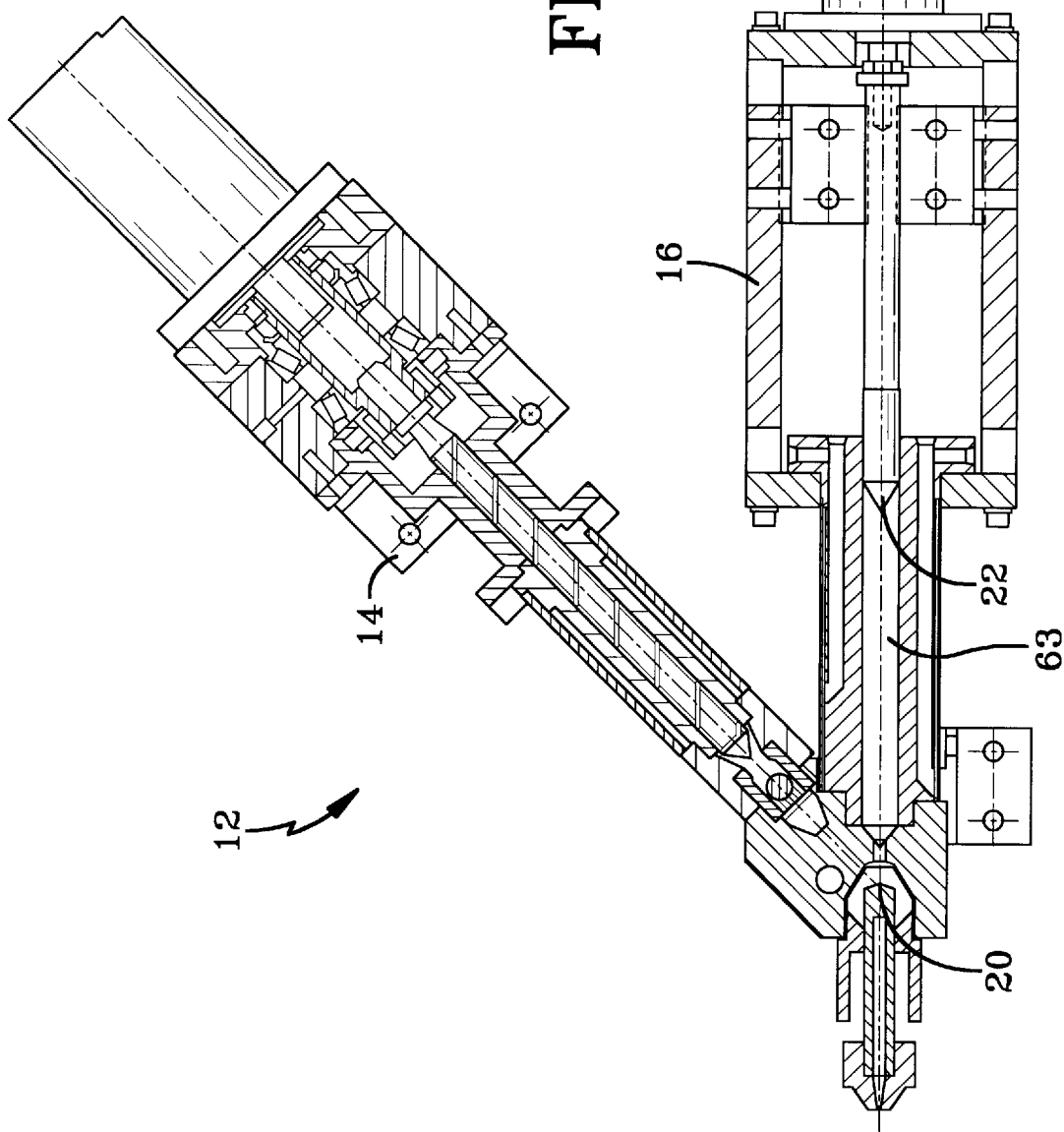
FIG. 6 is a sectional view of the extruder and injector used in this invention.

With reference now to FIGS. 3–5, the modular injection molding machine 10 has a carriage assembly 28 which carries the extruder/injector assembly 12 along linear bearings 30 which are rigidly attached to front plate 32 of the first adder module 13 and to the first plates 34 of the basic unit assembly 11. The carriage assembly 28 carries the extruder/injector assembly 12 between clamping apparatuses, shown in FIG. 1, such as between first, second and third clamping apparatuses 50*a*, 50*b*, 50*c*. The carriage assembly 28 includes, as is commonly known in the art, a support plate 27 to which the extruder/injector assembly 12 is rigidly attached, an electric cable support structure 33 which allows the electric cables 31 to be supported during motion of the extruder/injector assembly 12 and, a motorized pulley/belt assembly 36 which provides the locomotion. The basic unit assembly 11 includes a temperature regulator 38 which regulates the temperature of the extruder/injector assembly 12 and a hydraulic unit 40 which provides hydraulic power to the extruder/injector assembly 12 for injection control and also provides hydraulic power for the clamping apparatuses 50 such as first clamping apparatus 50*a*. The preferred temperature regulator 38 consists of two temperature zones (not shown) wherein one zone is for the extruder 14 and the other is for the injector 16. Temperature regulator 38 is preferably custom made for this application. The hydraulic unit 40 is commercially available and can be of any type chosen with sound engineering judgment for this invention.

Figure 2:
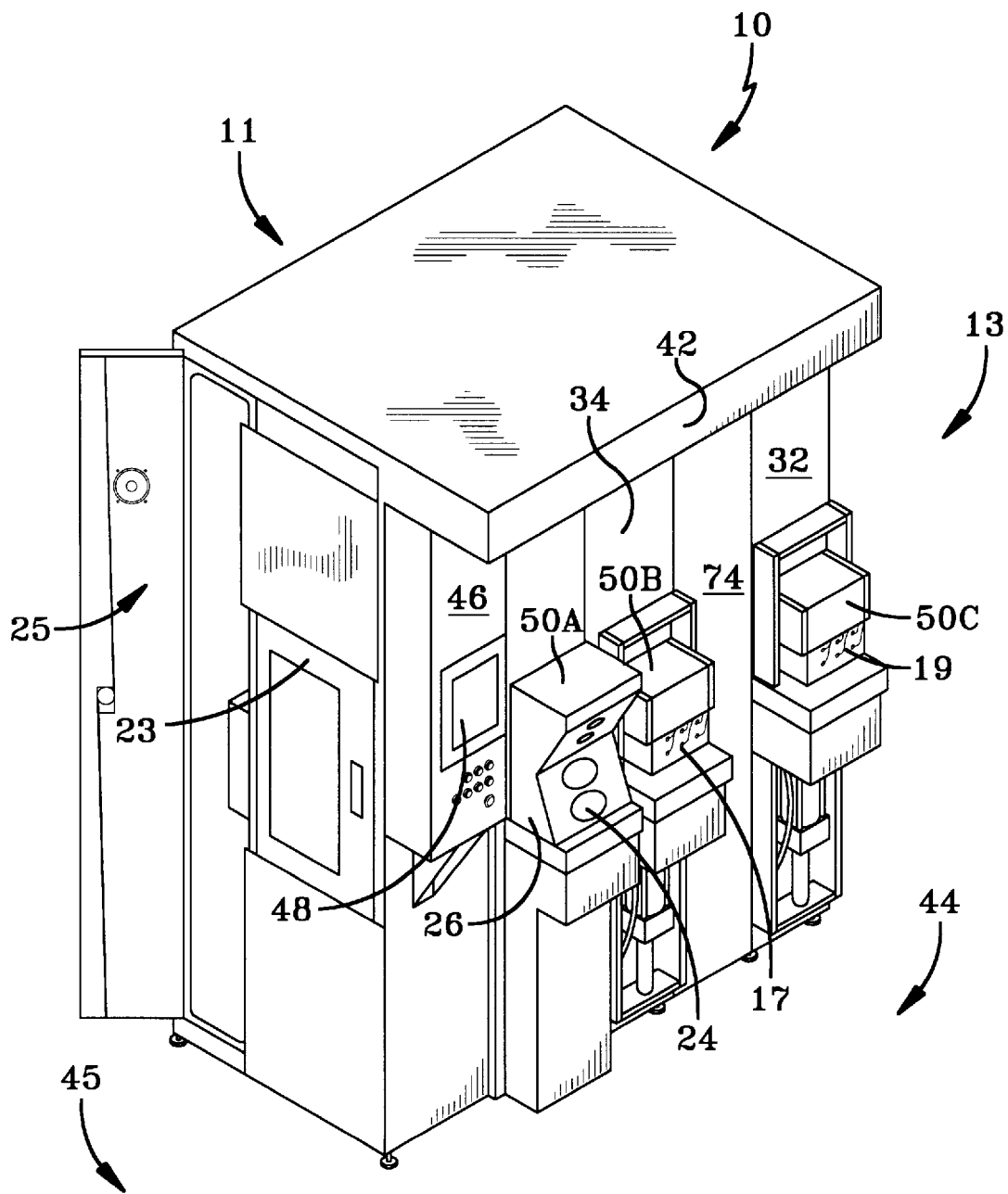
FIG. 2 is perspective front/left side view illustrating first and second operator areas.

With reference now to FIGS. 1–5, the modular injection molding machine 10 has an electric panel 25 which houses all the necessary controls. The electric panel 25 includes an overhang 42 which can be used to hold various operator assistance devices such as fresh air ductwork, air conditioning ducts, exhaust fans or speakers (none shown) over a first operator area 44. The overhang 42 herein shown has lights 43 which assist the operator in visual inspection of the molds, such as first mold 26, though many other operator assistance devices chosen with sound engineering judgment could also be used. The electric panel 25 also includes an operator station 46 which, in this preferred embodiment, is selectively rotatable between first and second operator areas 44, 45. In FIG. 2 the operator station 46 is shown facing first operator area 44 and in FIG. 3 operator station 46 is shown facing second operator area 45. The operator station 46 has a computer screen 48 which is eye level to report machine alarms, machine status etc. In this way, the operator station is useful for normal machine operation as well as for maintenance operations. Enclosing the extruder/injector assembly 12, the carriage assembly 28, the temperature regulator 38 and the hydraulic unit 40 is enclosure 55. Enclosure 55 includes framing 56 and see-through walls 57. Connecting to enclosure 55 is first and second safety interlock doors 58, 59 which in this preferred embodiment are made of see-through material. When either first or second safety interlock door 58 or 59 is opened, the modular injection molding machine 10 is switched into an operator safe condition as is commonly known in the art until they are both closed again. This is accomplished by means currently known in the art. First and second safety interlock doors 58, 59 are equipped with lift off hinges 54 to ease access to the modular injection molding machine 10 during maintenance.

Figure 7:
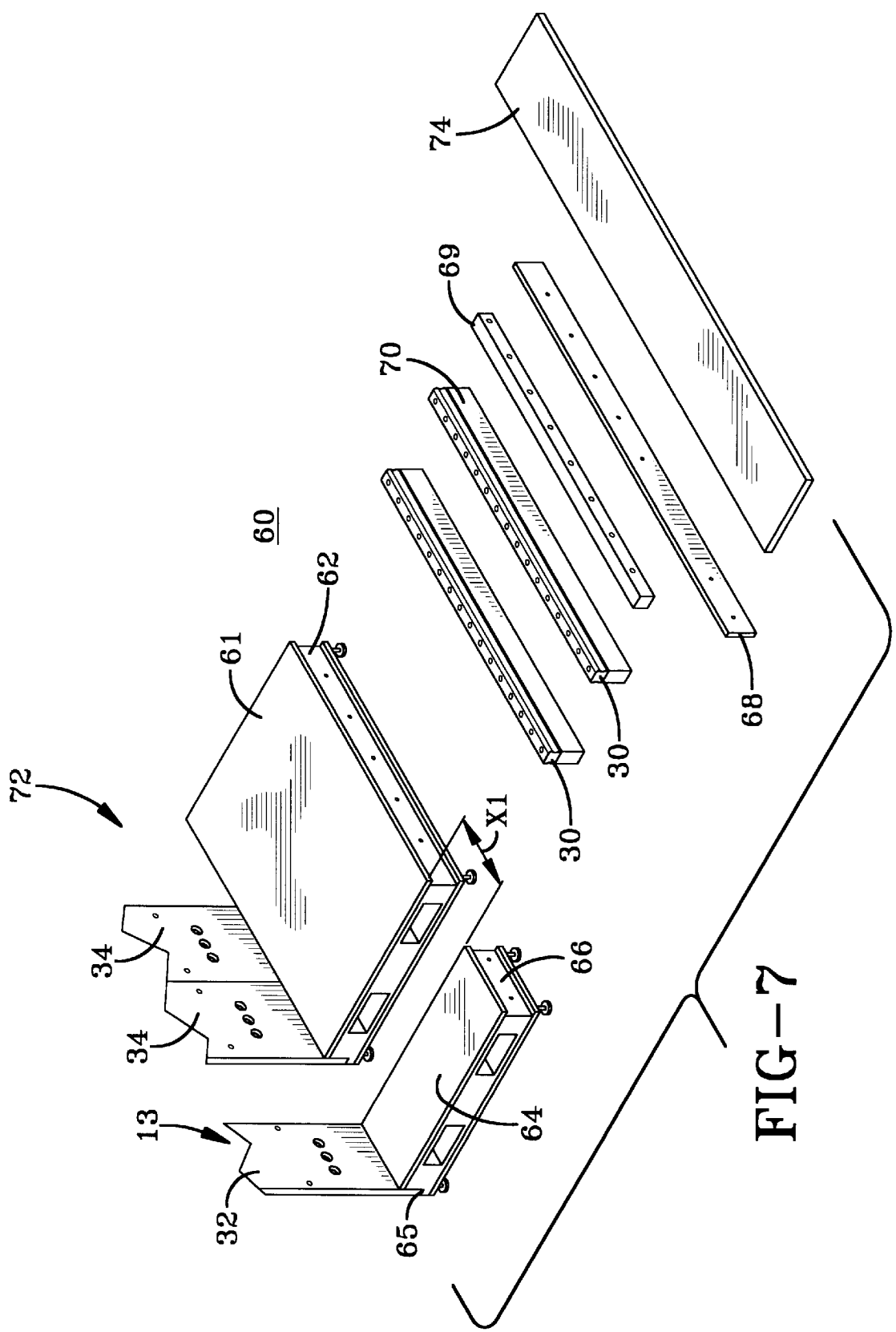
FIG. 7 is a partial top view of the components used to form the main frame of the basic unit assembly and the first adder module.
Figure 8:
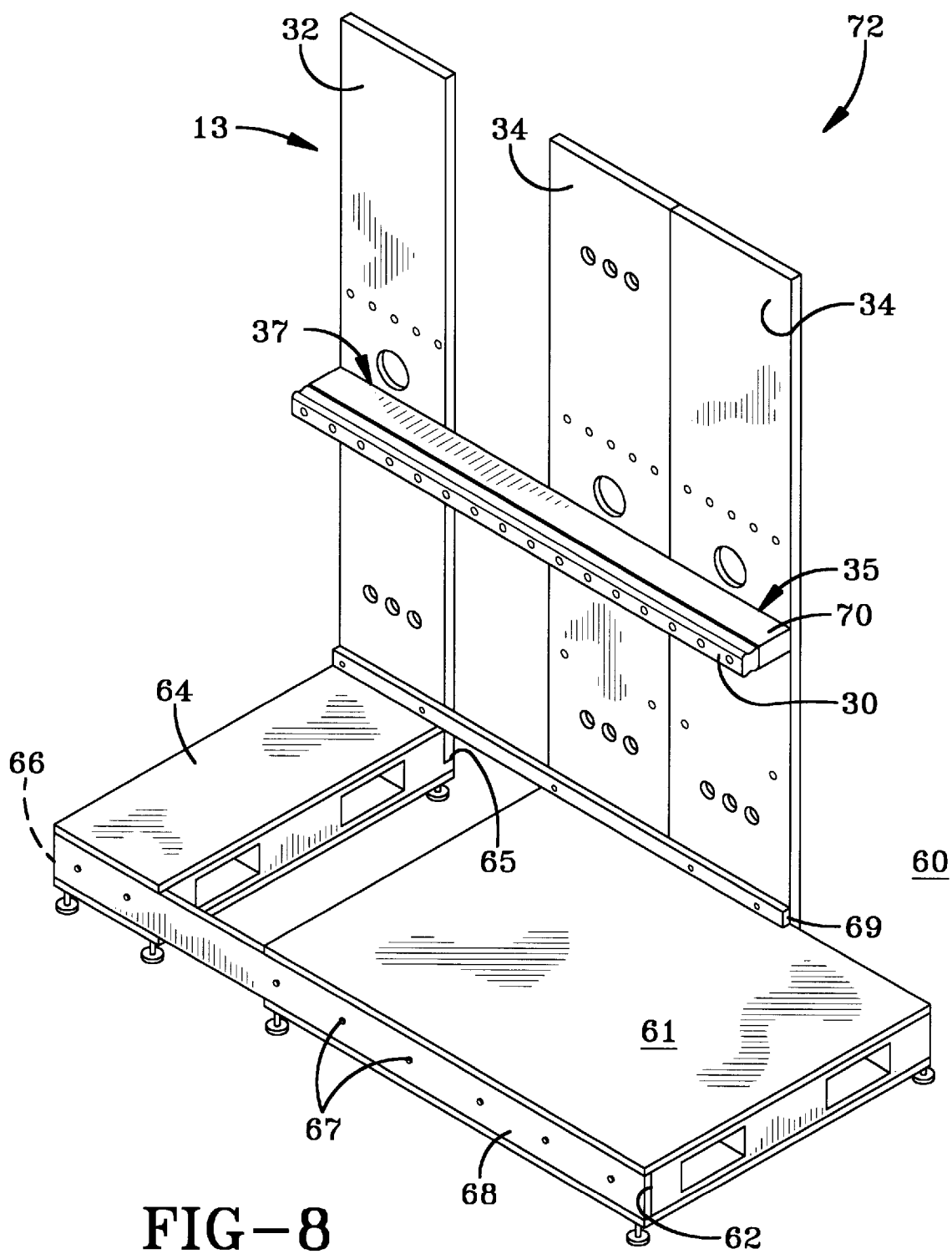
FIG. 8 is a left side view showing how the adder module is connected to the main frame of the basic unit assembly.
Figure 9:
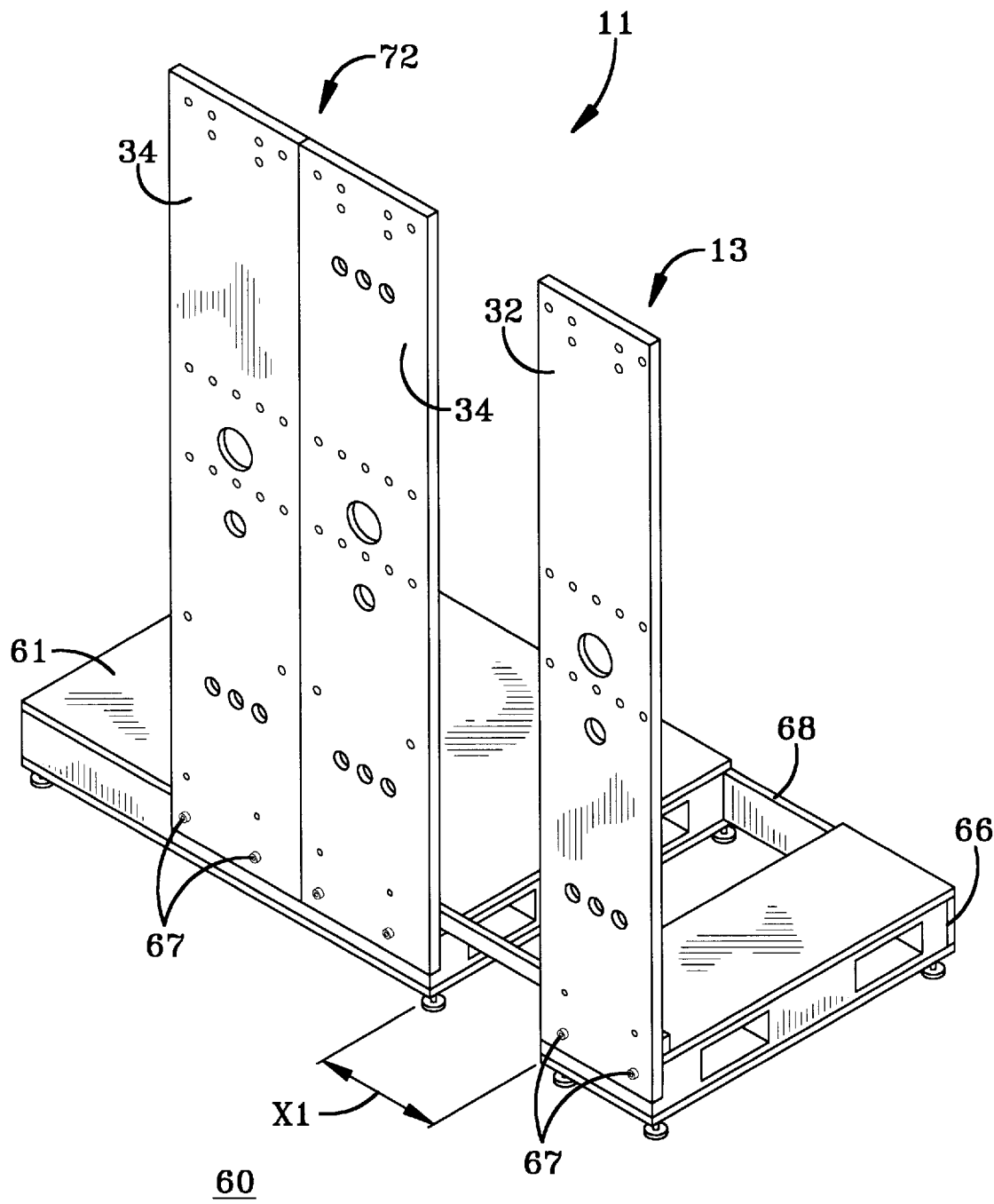
FIG. 9 is a front view showing the laterally spaced distance between the adder module and the main frame of the basic unit assembly.

With reference now to FIGS. 1 and 7–9, one of the advantages to the modular injection molding machine 10 herein disclosed is the ease and flexibility of adding an adder module, such as first adder module 13, to the basic unit assembly 11. This is accomplished using connecting means which also align the adder module to the basic unit assembly 11 as will now be discussed. To better illustrate how an adder module can be added, FIGS. 7–9 show the main frame assembly 72 of the basic unit assembly 11. Though the main frame assembly 72 is, in FIGS. 7–9, shown without the hydraulic unit 40 (shown in FIGS. 4–5) as well as all the other equipment disclosed above, it should be noted that an adder module would be added in a similar manner if all such equipment was installed. The main frame assembly 72 includes a bottom plate 61 horizontally disposed on a floor area 60 and first plates 34 vertically disposed and rigidly connected to the bottom plate 61. Although this embodiment illustrates two first plates 34 supporting first and second clamping apparatus 50*a*, 50*b* only one first plate 34 and one clamping apparatus 50 is necessary for this invention. The bottom plate 61 has a back key slot 62 and the first plates 34 have a key slot 35. The first adder module 13 has a base plate 64 horizontally disposed on floor area 60. The base plate 64 has a front shelf 65 and a back key slot 66. The first adder module 13 also has a front plate 32 vertically disposed which has a key slot 37. To add the first adder module 13 to the basic unit assembly 11, the base plate 64 is first placed on the floor area 60 at any selectable laterally spaced distance X1 from the bottom plate 61. This laterally spaced distance X1 is selected based on the desired distance between the newly added clamping apparatus, such as third clamping apparatus 50*c* (shown in FIG. 1), and one of the existing clamping apparatuses, such as second clamping apparatus 50*b*. The front plate 32 is then registered on the front shelf 65 where it is secured to the base plate 64 with connecting means such as bolts 67. This precisely lines up the front plate 32 with the base plate 64. Next, a back key 68 is installed by placing it within the back key slot 62 of the bottom plate 61 and the back key slot 66 of the base plate 64 where it is secured with connecting means such as bolts 67. A tie bar 69 is then rigidly connected to the bottom plate 61, the first plates 34, the base plate 64 and the front plate 32 with connecting means such as bolts 67. After that, a front key 70 is installed by placing it within the key slot 35 of the first plates 34 and the key slot 37 of the front plate 32 where it is secured with connecting means such as bolts 67. In this embodiment, the front key 70 is used to support linear bearings 30 (also shown in FIGS. 3–5) but it is not required for this invention. The installation of the front key 70 effectively aligns the entire modular injection molding machine 10. Finally, a clamping apparatus, such as third clamping apparatus 50*c*, is rigidly secured to the front plate 32. It should be noted that the basic unit assembly 11 may only have one clamping apparatus originally so that the clamping apparatus added by first adder module 13 would be in fact the second clamping apparatus. The back key 68, the tire bar 69 and the front key 70 lengths are sized according to the laterally spaced distance X1. Though bolts 67 are the preferred means for connecting the pieces just described, any connecting means chosen with sound engineering judgment could also be used with this invention. It should be noted that any number of adder modules can be added with no major modification to the basic unit assembly 11 via bottom plate 61 and first plate 34 or to an adder module, such as first adder module 13, via base plate 64 and front plate 32 as just described. Each adder module is intended to hold its own clamping apparatus 50 which would hold its own mold. In the preferred embodiment herein disclosed, the electric panel 25 and the hydraulic unit 40 (shown in FIGS. 4–5) have been sized to provide all the necessary controls and hydraulic power for up to 4 clamping apparatuses 50. For this reason, to add an adder module it is only necessary to make the modifications just mentioned. Optionally, but recommended, the enclosure 55 (shown in FIGS. 4–5) can be selectively expanded to enclose the adder module or modules, such as first adder module 13. The enclosure 55 would preferably include a cover sheet 74 (shown in FIGS. 1, 2, 4 and 7) to cover the space between the first plates 34 and the front plate 32. Note, with reference to FIG. 1, that it is also preferred to mount the clamping apparatuses 50 external the enclosure 55. Of course the modular injection molding machine 10 can be designed to accommodate any desired number of clamping apparatuses 50 chosen with sound engineering judgement.

With continuing reference to FIGS. 1 and 7–9, it is contemplated that should a part (not shown) being made have a load/unload time equal to the injection/cure time, two clamping apparatuses 50 would be ideal. If a higher volume of parts is required, a second operator could operate two additional clamping apparatuses 50 added to the same modular injection molding machine 10. In such a case, the extruder/injector assembly 12 would serve all four clamping apparatuses 50. If, on the other hand, a part being made has a load/unload time less than the injection/cure time, additional clamping apparatuses 50 could be added for the first operator without the need to purchase another machine. In this way both the operator(s) and the extruder/injector assembly 12 can be used efficiently.

With reference now to FIGS. 1 and 10–13, the preferred clamping apparatus 50 will now be disclosed. The clamping apparatus 50 (first, second and third clamping apparatuses 50a, 50b, 50c are examples) includes a first clamp assembly 80, a second clamp assembly 90, a lower platen assembly 100, an upper platen assembly 110 and moving means for selectively moving the second clamp assembly 90. The preferred moving means is a hydraulic cylinder 120. In this preferred embodiment the hydraulic cylinder 120 has a 3.25 inch bore, is designed to operate at about 3000 pounds per square inch of hydraulic pressure and is commercially available from the Rexroth company. Of course other moving means known in the art, including other cylinders, chosen with sound engineering judgement could also be used in this invention. One important advantage of preferred clamping apparatus 50 is that three sides 134, 135, 136 are open for the operator to access the mold 130. By open it is meant that the operator is not inhibited from accessing the associated mold for visual inspection and load/unload operations.

With continuing reference to FIGS. 1 and 10–13, the first clamp assembly 80 includes top cross member 82, first and second upper raise blocks 83, 84, left and right outer clamp plates 85, 86 and means for connecting the first clamp assembly 80 to the moving means. Only one upper raise block is necessary though two are preferred. In this preferred embodiment, the means for connecting to the moving means is first cylinder mount 87 which is operatively connected to hydraulic cylinder 120 using bolts 77. The top cross member 82, left and right outer clamp plates 85, 86 and the first cylinder mount 87, when assembled as shown, together form a rigid box. By rigid box it is meant that they form a rectangular box-like structure which is rigid and strong. The first clamp assembly 80, and thus the clamping apparatus 50, is preferably rigidly mounted to an associated support structure. When combined with the modular injection molding machine 10 disclosed above, the clamp assembly 80 is preferably mounted to either one of the first plates 34 of the basic unit assembly 11 or to the front plate 32 of an adder module such as first adder module 13. Other support structures chosen with sound engineering judgement could also be used to support the first clamp assembly 80. The left outer clamp plate 85 has a first slot 81 and the right outer clamp plate 86 has a second slot (not shown but generally referred to as 88 in FIG. 12) which is similar to first slot 81. First and second slots 81, 88 will be discussed further below.

Still referring to FIGS. 1, and 10–13, the second clamp assembly 90 includes inner rear cross member 91, inner top cross member 92, left and right inner clamp plates 93, 94 and means for connecting the second clamp assembly 90 to the moving means. Left inner clamp plate 93 has a first guide bar 95 and right inner clamp plate 94 has a second guide bar (not shown but generally referred to as 96 in FIG. 12) which is similar to first guide bar 95. Left inner clamp plate 93 also has a first lower raise block 97 and right inner clamp plate 94 has a second lower raise block (not shown but generally referred to as 98 in FIG. 12) which is similar to first lower raise block 97. Only one upper raise block is necessary though two are preferred. In this preferred embodiment, the means for connecting to the moving means is second cylinder mount 99 which is operatively connected to the rod 122 of hydraulic cylinder 120. The inner rear cross member 91, inner top cross member 92, left and right inner clamp plates 93, 94 and second cylinder mount 99 when assembled as shown, together form a rigid box. By rigid box it is meant that they form a rectangular box-like structure which is rigid and strong. First and second guide bars 95, 96 are preferably made of bronze and are pressed into left and right inner clamp plates 93, 94 respectively. Grease fittings 39 allow proper lubrication to be provided to first and second guide bars 95, 96.

With continuing reference to FIGS. 1, and 10–13, the basic clamping motion of clamping apparatus 50 is as follows. First and second clamp assemblies 80, 90 work together to provide a clamping force between upper and lower bolsters 111, 101. Hydraulic cylinder 120 selectively extends forcing second clamp assembly 90 in downward direction 149. First and second guide bars 95, 96 slide vertically within first and second slots 81, 86 respectively, permitting this motion. First and second guide bars 95, 96 along with first and second slots 81, 86 carry the bending loads generated during clamping. The materials used for both first and second clamp assemblies 80, 90 utilize the purchased tolerances from the steel companies. This reduces the cost substantially.

Figure 10:
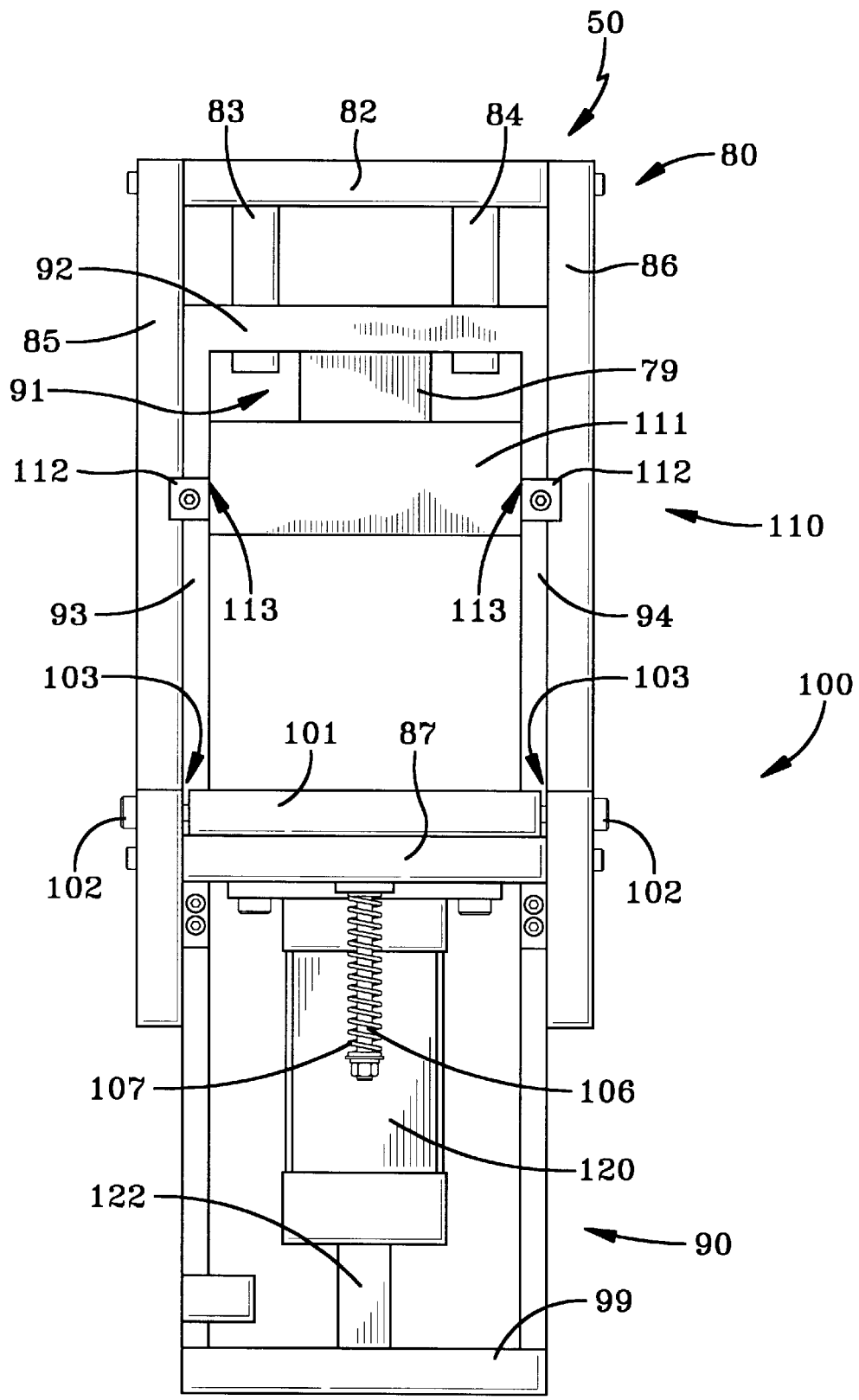
FIG. 10 is a front view of the preferred clamping apparatus of this invention.
Figure 11:
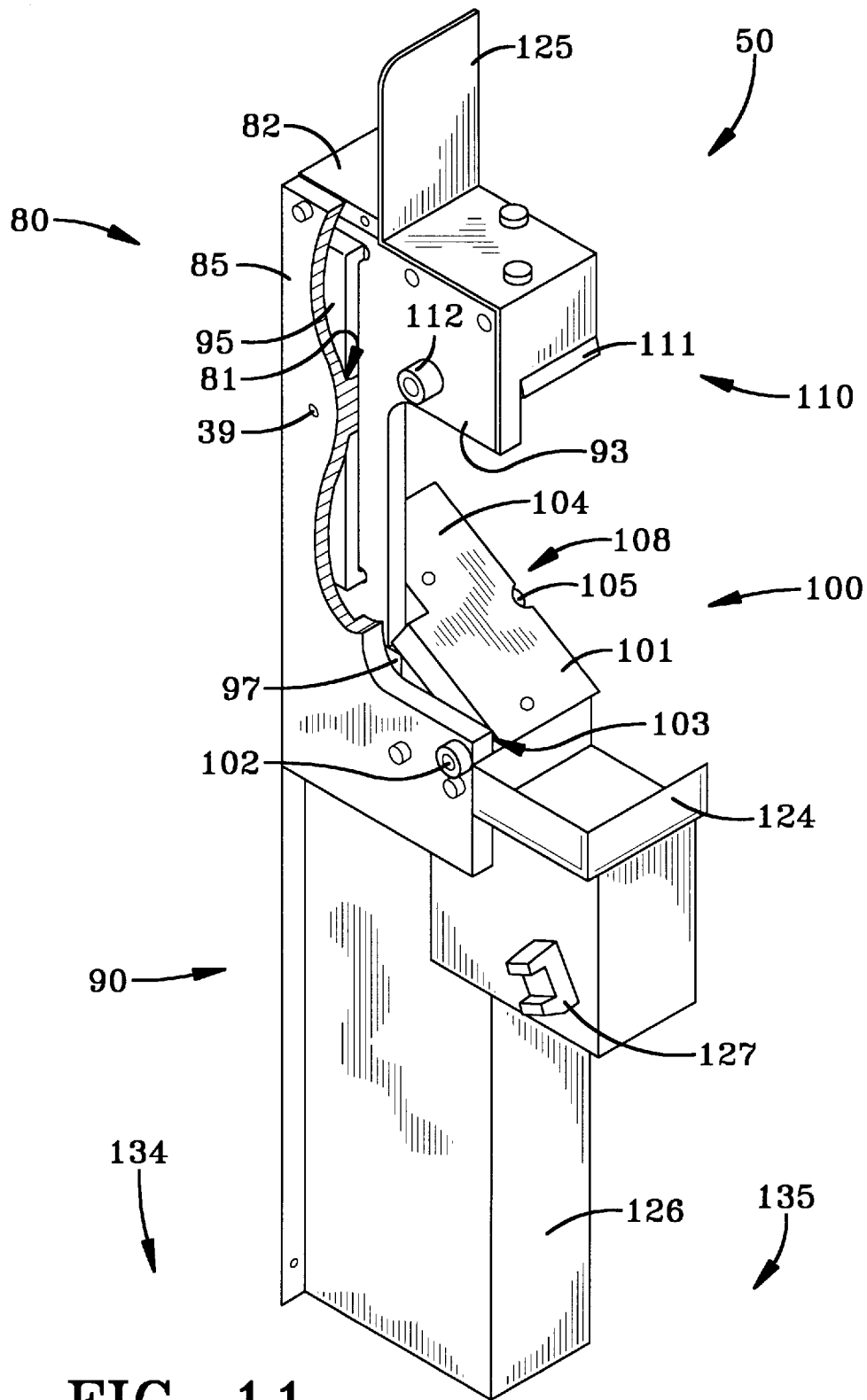
FIG. 11 is a perspective partial cut-a-way view of the clamping apparatus illustrating the guide bar which permits motion and carries the bending loads.
Figure 12:
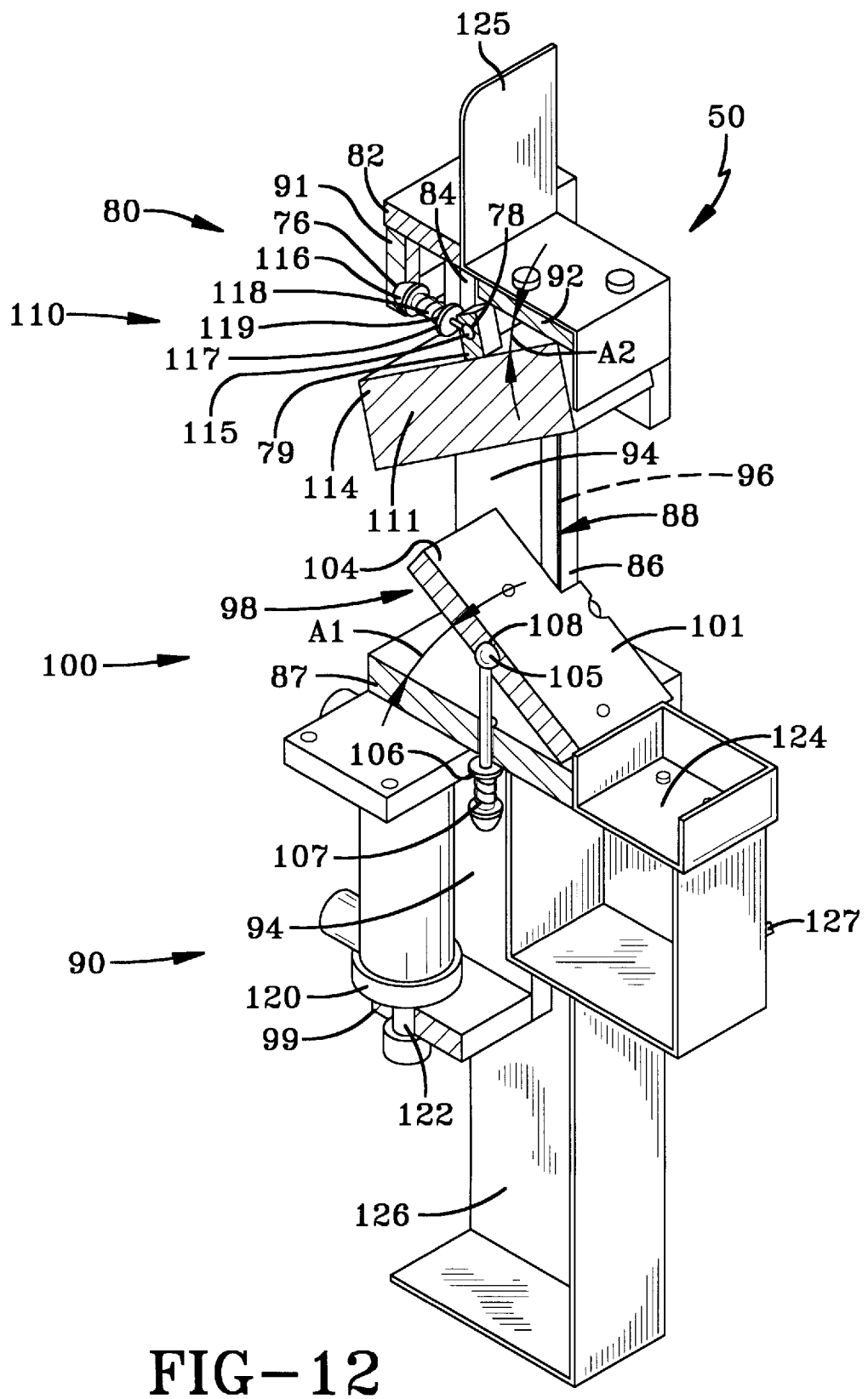
FIG. 12 is a perspective view of the clamping apparatus illustrating the lower and upper spring means used to spring lower and upper bolsters.
Figure 13:
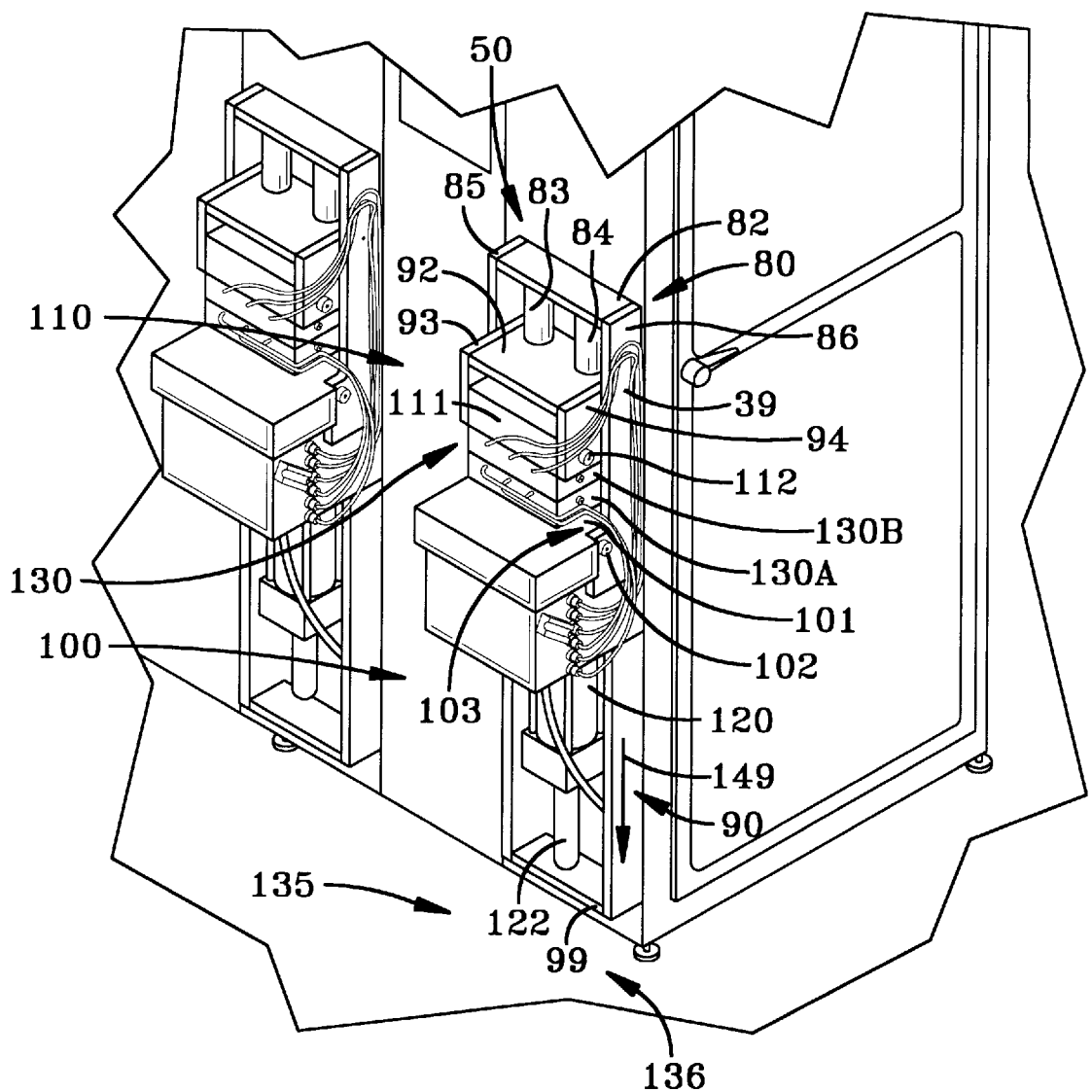
FIG. 13 is a right side view of the clamping apparatus shown when loaded.

With ongoing reference to FIGS. 1 and 10–13, lower platen assembly 100 includes lower bolster 101 which is used to hold the lower half 130a of a mold 130 and lower spring means for springing lower bolster 101. It is possible in this invention to use the lower bolster 101 for other purposes besides holding a mold 130. Lower bolster 101 (and thus lower platen assembly 100) is pivotably connected to the first clamp assembly 80 using shoulder bolts 102 and bearings 103 which connect lower bolster 101 to left and right outer clamp plates 85, 86. The bearings 103 are positioned within holes (not visible) within lower bolster 101 and receive shoulder bolts 102 as is commonly known in the art. As the clamping apparatus 50 is opened, the back 104 of lower bolster 101 contacts first and second lower raise blocks 97, 98. The lower bolster 101 then pivots on the shoulder bolts 102 and bearings 103 as hydraulic cylinder 120 is retracted. The amount of pivoting can be adjusted by varying the position of first and second lower raise blocks 97, 98 on left and right inner clamp plates 93, 94. The pivot position can be illustrated, as seen in FIG. 12, using the angle A1. A pivot position of 0, meaning angle A1 is at 0°, indicates that the lower bolster 101 is at a position parallel with the first cylinder mount 87 as seen in FIG. 10. In the preferred embodiment, the lower bolster 101 is selectively pivotable within a range of 0° to 30°, i.e., angle A1 can be any angle between 0° and 30°. It may also be desirable to avoid the use of first and second lower raise blocks 97, 98 completely thus maintaining the pivot position at 0. The lower spring means is used to push against the afore mentioned pivoting action so that when the clamping apparatus 50 is closed as shown in FIG. 13, lower bolster 101 returns to its original position which is a pivot position of 0°. The lower spring means can also be adjusted so that the pushing force exerted can also be adjusted. In the preferred embodiment, the lower spring means comprises a lower ball 105, a lower spring shaft 106 and a lower spring 107. The lower ball 105 is received within spherical opening 108 in lower bolster 101. The lower spring shaft 106 is rigidly connected to the lower ball 105 and receives lower spring 107 around it. The lower ball 105 is preferably made of brass because it is relatively easy to machine a ball contact surface with a ball end mill and brass balls are relatively inexpensive. When the clamping apparatus 50 is closed, as shown in FIG. 13, the clamping load is carried directly through lower bolster 101 to first cylinder mount 87.

Still referring to FIGS. 1 and 10–13, upper platen assembly 110 is similar in many respects to lower platen assembly 100 and includes upper bolster 111 which is used to hold the upper half 130b of a mold 130, upper spring mount 79 and upper spring means for springing upper bolster 111. It is possible in this invention to use the upper bolster 111 for other purposes besides holding a mold 130. Upper bolster 111 (and thus upper platen assembly 110) is pivotably connected to the second clamp assembly 90 using shoulder bolts 112 and bearings 113 which connect upper bolster 111 to left and right inner clamp plates 93, 94. The bearings 113 are positioned within holes (not visible) within upper bolster 111 and receive shoulder bolts 112 as is commonly known in the art. As the clamping apparatus 50 is opened, the back 114 of upper bolster 111 contacts first and second upper raise blocks 83, 84. The upper bolster 111 then pivots on the shoulder bolts 112 and bearings 113 as hydraulic cylinder 120 is retracted. The amount of pivoting can be adjusted by varying the position of first and second upper raise blocks 83, 84 on top cross member 82. The pivot position can be illustrated, as seen in FIG. 12, using the angle A2. A pivot position of 0, meaning angle A2 is at 0°, indicates that the upper bolster 111 is at a position parallel with inner top cross member 92 as seen in FIG. 10. In the preferred embodiment, the upper bolster 111 is selectively pivotable within a range of 0° to 30°, i.e., angle A2 can be any angle between 0° and 30°. It may also be desirable to avoid the use of first and second upper raise blocks 83, 84 completely thus maintaining the pivot position at 0. The upper spring means is used to push against the afore mentioned pivoting action so that when the clamping apparatus 50 is closed as shown in FIG. 13, upper bolster 111 returns to its original position which is a pivot position of 0°. The upper spring means can also be adjusted so that the pushing force exerted can also be adjusted. In the preferred embodiment, the upper spring means comprises first and second upper balls 115, 116, first and second upper spring shafts 117, 118 and an upper spring 119. The first upper ball 115 is received within spherical opening 78 in upper spring mount 79 and is rigidly connected to first upper spring shaft 117. The second upper ball 116 is received within spherical opening 76 in inner rear cross member 91 and is rigidly connected to second upper spring shaft 118. First and second upper spring shafts 117, 118 are connected to each other and each receives upper spring 119 around them. First and second upper balls 115, 116 are preferably made of brass because it is relatively easy to machine a ball contact surface with a ball end mill and brass balls are relatively inexpensive. When the clamping apparatus 50 is closed, as shown in FIG. 13, the clamping load is carried directly through the shoulder bolts 102 and bearings 103 as well as through inner rear cross member 91.

Figure 14:
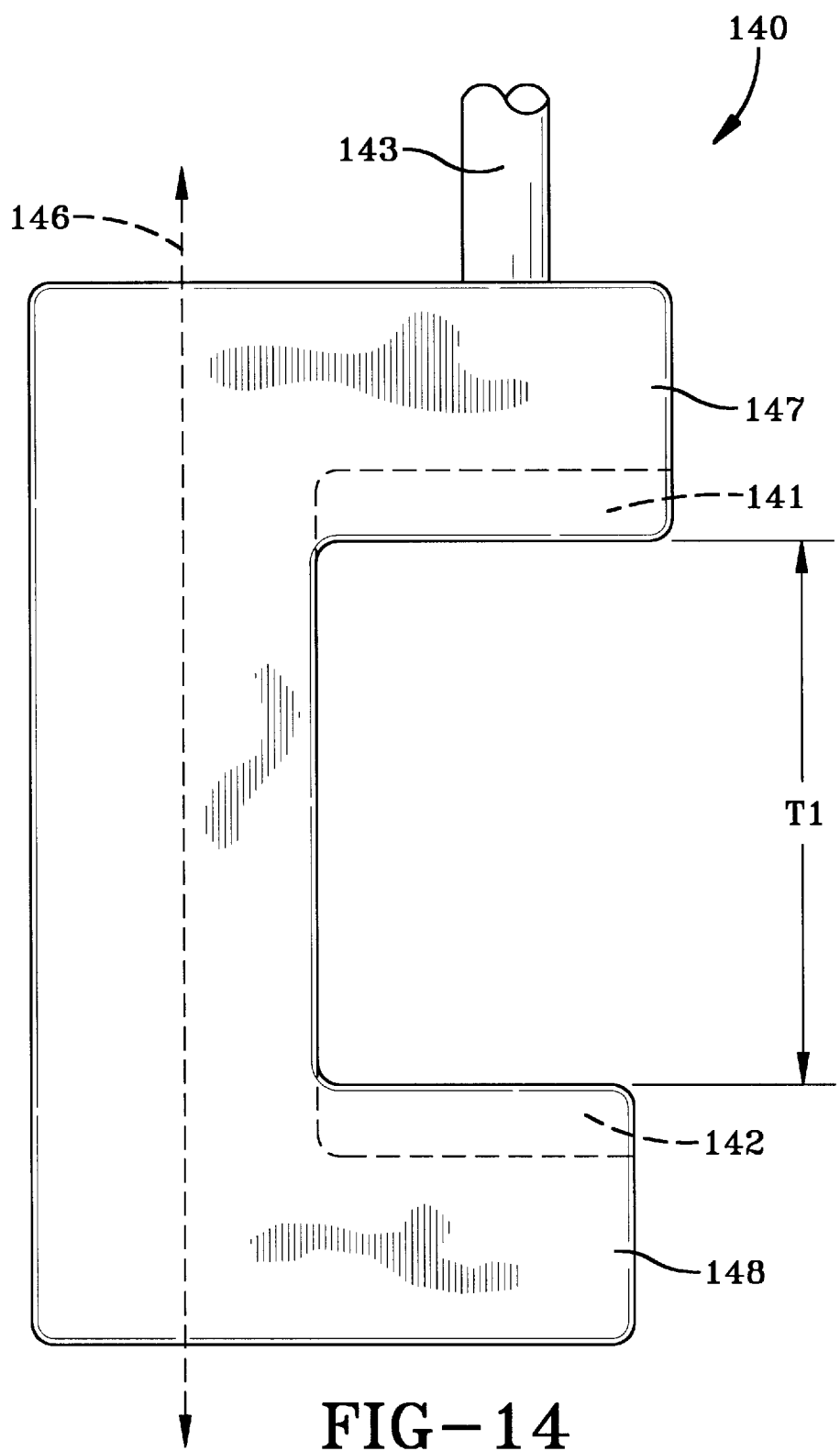
FIG. 14 is a side view of a prior art C frame clamping apparatus shown fully open.
Figure 15:
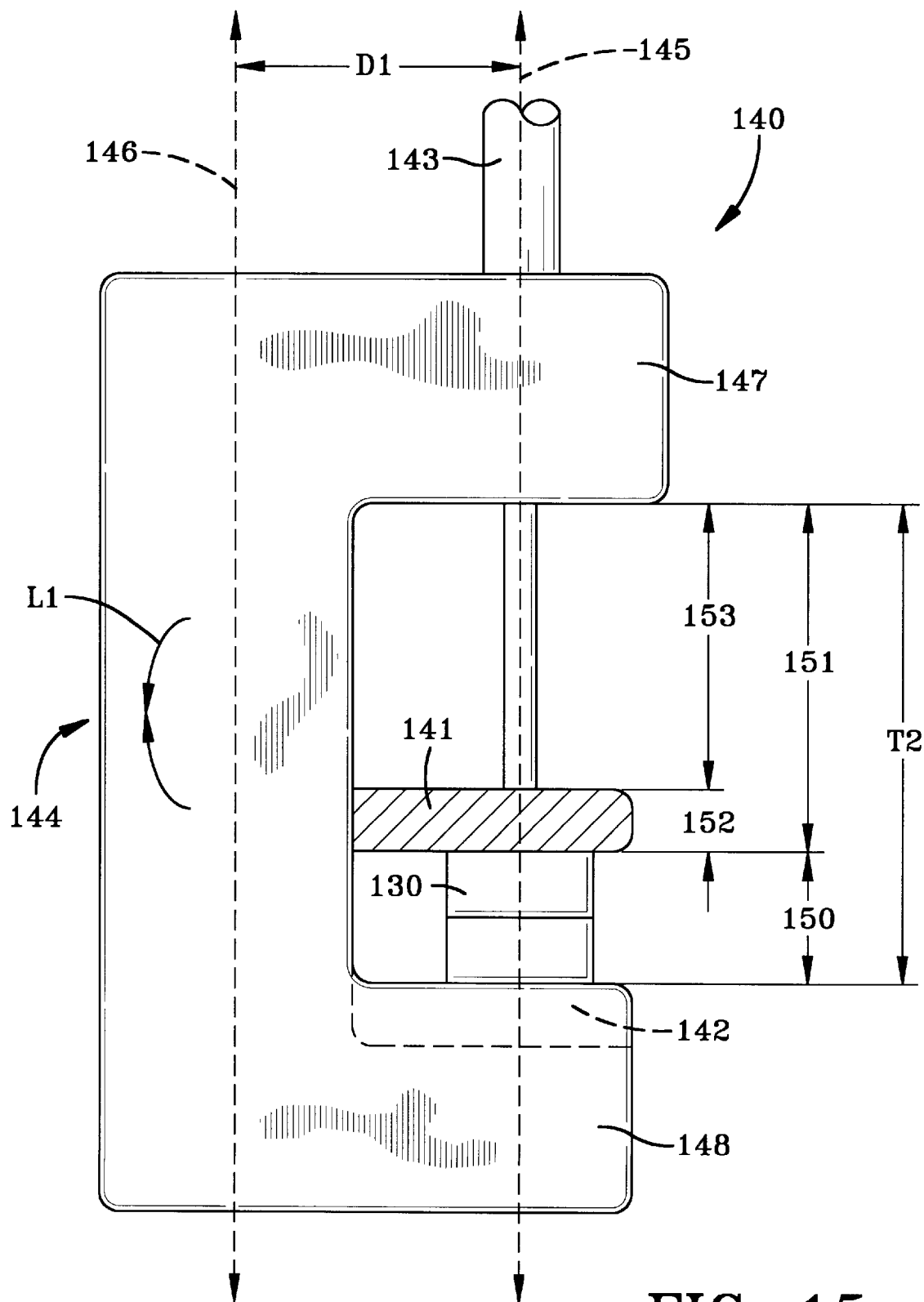
FIG. 15 is a side view of a prior art C frame clamping apparatus shown loaded and illustrating the closed tip to tip distance.
Figure 16:
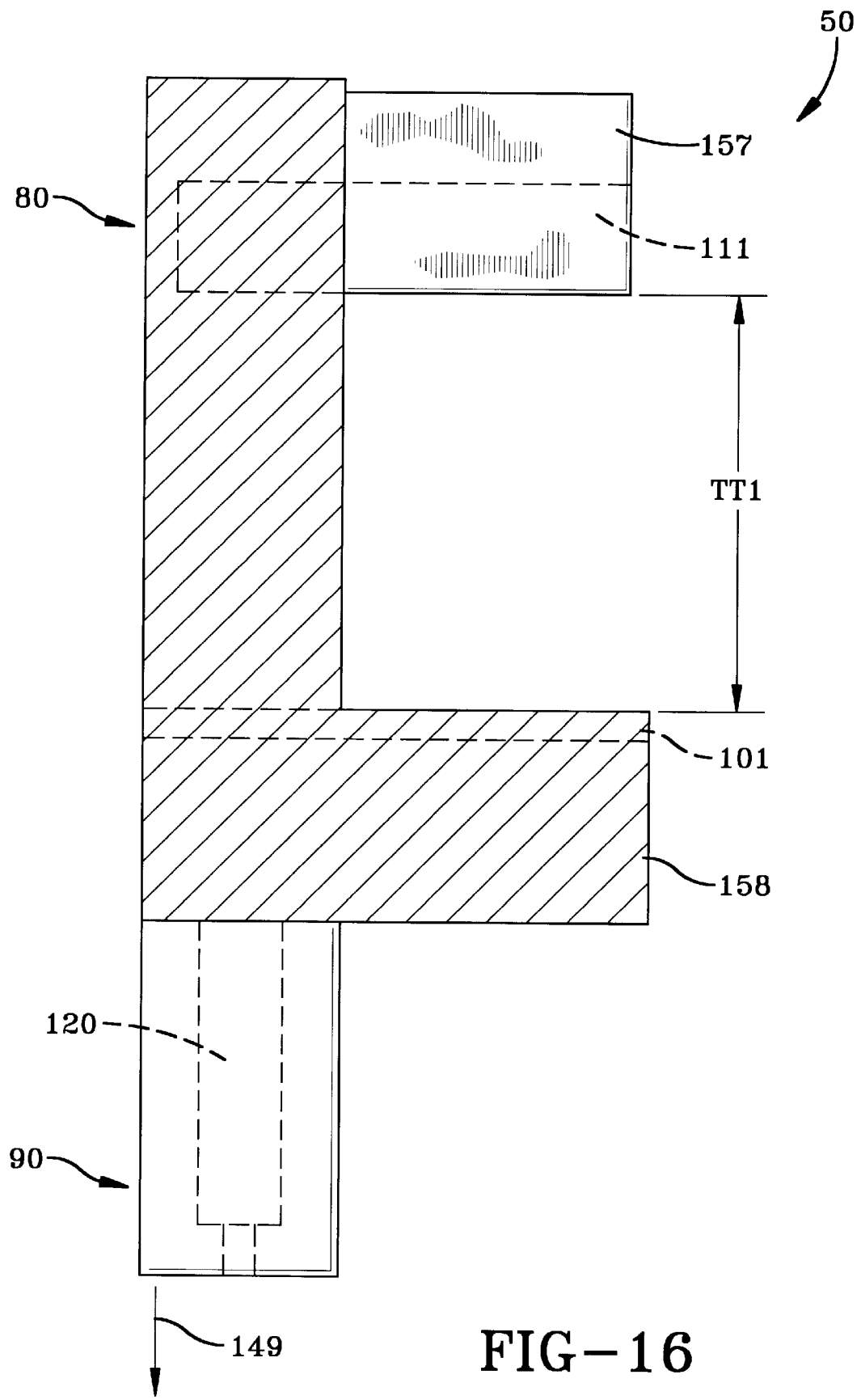
FIG. 16 is a side view of the preferred clamping apparatus of this invention shown fully open.
Figure 17:
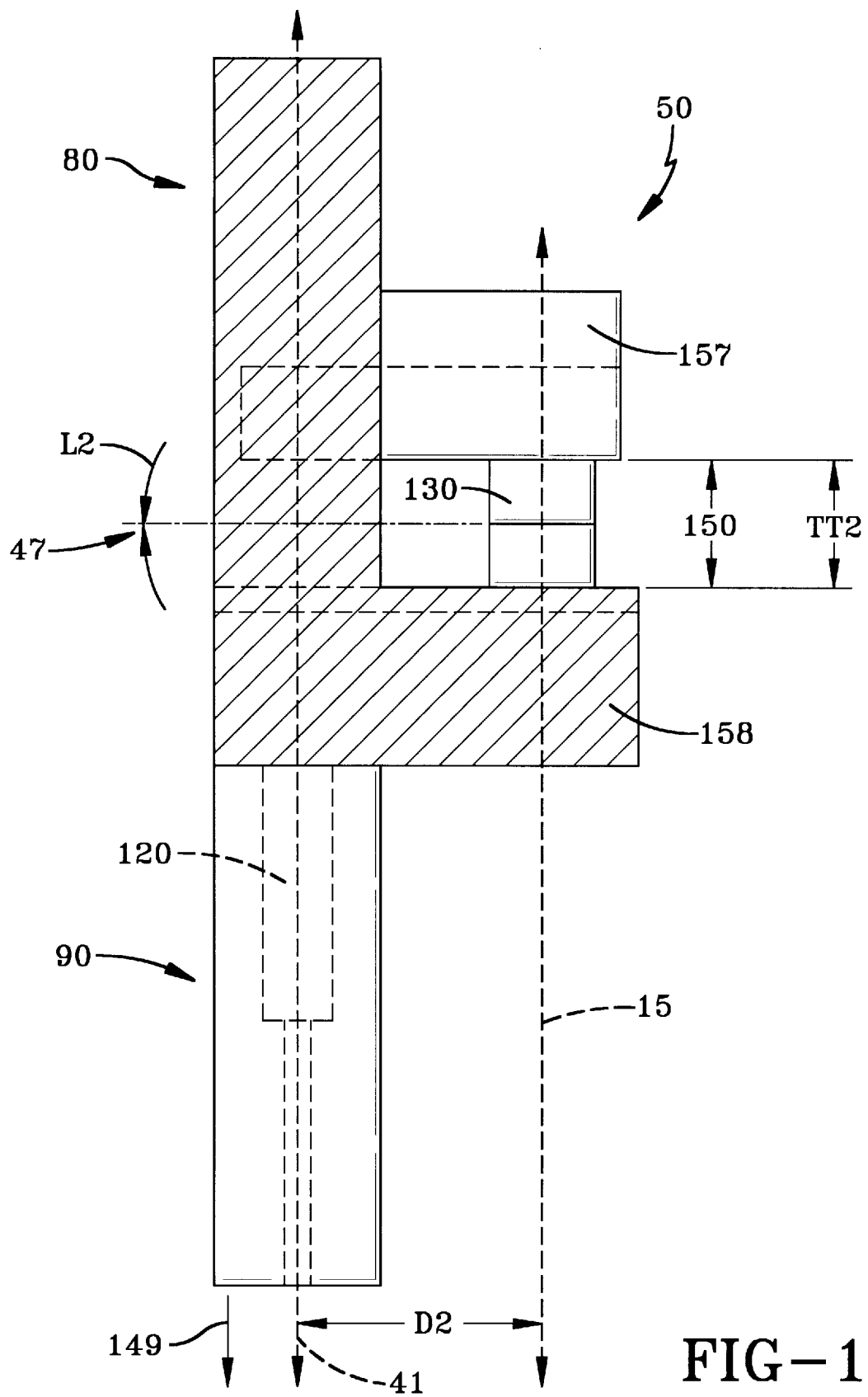
FIG. 17 is a side view of the preferred clamping apparatus shown loaded and illustrating the closed tip to tip distance.

With reference now to FIGS. 14–17, the C frame structure of the clamping apparatus 50 will be discussed. It is currently known in the art, as seen in FIGS. 14–15, to use a C frame clamping apparatus such as prior art clamping apparatus 140. Prior art clamping apparatus 140 includes upper and lower bolsters 141, 142 (not readily visible behind the C frame so shown with dashed lines) for holding a mold such as mold 130 and cylinder 143 which provides clamping means. As is known in the art, the bending load L1 on the mid-section 144 when the prior art clamping apparatus 140 is under clamping load (shown in FIG. 15) is directly proportional to the distance D1 which is the distance between the load axis 145 and the frame centerline axis 146 and the closed tip to tip distance T2 which is the distance between upper frame member 147 and lower frame member 148. What is especially to be noted is that the tip to tip distance does not change for prior art clamping apparatus 140 whether it is open, where the open tip to tip distance is T1 as shown in FIG. 14, or whether it is closed, where the closed tip to tip distance is T2 as shown in FIG. 15. Thus, open tip to tip distance T1 is equal to closed tip to tip distance T2 no matter what the loading condition may be. The preferred clamping apparatus 50 of this invention as noted above has hydraulic cylinder 120 and upper and lower bolsters 111, 101 (not readily visible behind the C frame so shown with dashed lines) for holding a mold such as mold 130. Clamping apparatus 50 would have a bending load L2 on its mid-section 47 which is directly proportional to the distance D2 which is the distance between the load axis 15 and the frame centerline axis 41 and the closed tip to tip distance TT2 which is the distance between upper frame member 157 and lower frame member 158. However, the C frame herein disclosed is collapsible. By collapsible it is meant that upper frame member 157 moves relative to lower frame member 158 thus collapsing the C frame. This can be understood by noting that second clamp assembly 90 moves in downward direction 149 relative to first clamp assembly 80. This motion is explained further above. The collapsing C frame design provides that the tip to tip distance of clamping apparatus 50 is substantially smaller when closed, where the closed tip to tip distance is TT2 as shown in FIG. 17, than when it is open, where the open tip to tip distance is TT1 as shown in FIG. 16. Thus, closed tip to tip distance TT2 is substantially smaller than open tip to tip distance TT1. Therefore, the bending load L2 on mid-section 47 of clamping apparatus 50 is significantly less than bending load L1 on mid-section 144 of prior art clamping apparatus 140 when both have the same load and when distance D1 equals distance D2. This is true because closed tip to tip distance TT2 is substantially less than closed tip to tip distance T2. Thus, mid-section 47 can be safely designed with a smaller cross-sectional area than mid-section 144 when done with sound engineering judgment. The difference between closed tip to tip distance TT2 and closed tip to tip distance T2 can be better understood by considering what components make up these distances. For preferred clamping apparatus 50, the closed tip to tip distance TT2 consists only of the mold width 150 of mold 130. Thus, during clamp loading (shown in FIG. 17) mold width 150 is the same as closed tip to tip distance TT2. For the prior art clamping apparatus 140, however, the closed tip to tip distance T2 comprises the mold width 150 of mold 130 plus an addition distance 151. Additional distance 151 comprises the width 152 of upper bolster 141 plus the extension distance 153 which provides the necessary space for cylinder 143 to extend for clamping purposes. In should be noted that this additional distance 151 is essential to provide room for the prior art clamping apparatus 140 to open the mold 130. No such additional distance is required, however, for the preferred clamping apparatus 50.

With reference now to FIGS. 11–12, in the preferred embodiment the clamping apparatus 50 has other features now to be discussed. A tray 124 is useful for holding parts (not shown) to be molded or for holding scrap pieces (not shown). An upper guard 125 and a lower guard 126 protect the operator from moving parts. Preferably, a pair of safety switches 127 requiring operator engagement to operate the clamping apparatus 50 is also included.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:
What is claimed is:

1. A modular injection molding machine comprising:
   an injector assembly;
   a carriage assembly for carrying said injector assembly;
   a first clamping apparatus for holding an associated first mold;
   a main frame assembly, said main frame assembly supporting said first clamping apparatus; and,
   a first adder module assembly, said first adder module assembly selectively operatively connectable to said main frame assembly, said first adder module assembly supporting a second clamping apparatus at any selectable laterally spaced distance, said second clamping apparatus for holding an associated second mold, said carriage assembly selectively carrying said injector assembly between said first and second clamping apparatuses.

2. The modular injection molding machine of claim 1 wherein said first adder module assembly comprises:
   a front plate, said front plate for supporting said second clamping apparatus;
   a base plate having a front shelf, said front shelf supporting said front plate;
   connecting means for rigidly connecting said base plate and said front plate to said main frame assembly, said connecting means also aligning said base plate and said front plate to said main frame assembly.

3. The modular injection molding machine of claim 2 wherein said main frame assembly has a bottom plate with a back key slot and a first plate with a key slot, said base plate of said adder module having a back key slot, said front plate of said adder module having a key slot, said connecting means comprising:
   a back key, said back key selectively receivable within said back key slot of said bottom plate and within said back key slot of said base plate;
   a front key, said front key selectively receivable within said key slot of said first plate and within said key slot of said front plate; and,
   a tie bar, said tire bar rigidly connectable to said bottom plate, said base plate, said first plate and said front plate.

4. The modular injection molding machine of claim 1 further comprising:
   a temperature regulator, said temperature regulator for regulating the temperature of said injector assembly;
   a hydraulic unit, said hydraulic unit providing hydraulic power to said injector assembly for injection control, said hydraulic unit also providing hydraulic power to said first clamping apparatus for clamping operations, said hydraulic unit sized to provide hydraulic power to up to 4 clamping apparatuses; and,
   an electric panel, said electric panel housing all the necessary controls for up to 4 clamping apparatuses.

5. The modular injection molding machine of claim 4 wherein said electric panel has an overhang, said overhang overhanging a first operator area, said overhang for holding a first operator assistance device.

6. The modular injection molding machine of claim 5 further comprising;
   an operator station, said operator station selectively rotatable between a second operator area and said first operator area.

7. The modular injection molding machine of claim 4 further comprising:
   an enclosure, said enclosure enclosing said injector assembly, said carriage assembly, said temperature regulator and said hydraulic unit, said enclosure selectively expandable to enclose said first adder module; and,
   a first safety interlock door, said modular injection molding machine stopping operation when said first safety interlock door is opened.

8. The modular injection molding machine of claim 1 further comprising:
   an electric panel, said electric panel having an opening through which material is loaded for use with said injector assembly.

9. The modular injection molding machine of claim 1 further comprising:
   a second adder module assembly, said second adder module assembly selectively operatively connectable to said main frame assembly, said second adder module assembly also selectively operatively connectable to said front plate and said base plate of said first adder module, said second adder module assembly supporting a third clamping apparatus at any selectable laterally spaced distance, said third clamping apparatus for holding an associated third mold, said carriage assembly selectively carrying said injector assembly between said first, second and third clamping apparatuses.

10. The modular injection molding machine of claim 1 wherein said first clamping apparatus comprises:
    a first clamp assembly, said first clamp assembly rigidly mounted to said main frame assembly;
    a second clamp assembly, said second clamp assembly movably connected to said first clamp assembly;
    a lower platen assembly, said lower platen assembly operatively connected to said first clamp assembly;
    an upper platen assembly, said upper platen assembly operatively connected to said second clamp assembly; and,
    moving means for selectively moving said second clamp assembly.

11. The modular injection molding machine of claim 10 wherein said first and second clamp assemblies each form a rigid box.

12. The modular injection molding machine of claim 10 wherein said first and second clamp assemblies form a collapsible C frame.

13. The modular injection molding machine of claim 12 wherein said collapsible C frame has a closed tip to tip distance equal to the associated mold width.

14. The modular injection molding machine of claim 7 wherein said first and second clamping apparatuses are mounted external to said enclosure.

15. A clamping apparatus for an injection molding machine comprising:

a first clamp assembly, said first clamp assembly rigidly mounted to an associated support member;

a second clamp assembly, said second clamp assembly selectively movable relative to said first clamp assembly, said first and second clamp assemblies forming a collapsible C frame;

a lower platen assembly, said lower platen assembly operatively connected to said first clamp assembly;

an upper platen assembly, said upper platen assembly operatively connected to said second clamp assembly; and, moving means for selectively moving said second clamp assembly.

16. The clamping apparatus of claim 15 wherein said collapsible C frame has a closed tip to tip distance equal to the associated mold width.

17. The clamping apparatus of claim 15 wherein said first clamp assembly forms a rigid box.

18. The clamping apparatus of claim 15 wherein said second clamp assembly forms a rigid box.

19. The clamping apparatus of claim 15 further comprising three open sides.

20. The clamping apparatus of claim 15 wherein said first clamp assembly has a first slot, said second clamping apparatus having a first guide bar, said first guide bar selectively slidable within said first slot.

21. The clamping apparatus of claim 20 wherein said first clamp assembly has a first upper raise block, said first upper raise block for pivoting said upper platen assembly, said second clamp assembly having a first lower raise block, said first lower raise block for pivoting said lower platen assembly.

22. The clamping apparatus of claim 15 wherein said lower platen assembly is pivotably connected to said first clamp assembly, said upper platen assembly being pivotably connected to said second clamp assembly.

23. The clamping apparatus of claim 22 wherein said lower and upper platen assemblies are selectively pivotable within a range of 0° to 30°.

24. The clamping apparatus of claim 22 wherein said lower and upper platen assemblies comprise:

a lower bolster;

lower spring means for springing said lower bolster to a pivot position of substantially 0° when the clamping apparatus is placed in a closed position;

an upper bolster; and upper spring means for springing said upper bolster to a pivot position of substantially 0° when the clamping apparatus is placed in a closed position.

25. The clamping apparatus of claim 24 wherein said lower bolster has a spherical opening, said lower spring means comprising:

a lower ball, said lower ball receivable within said spherical opening in said lower bolster;

a lower spring shaft, said lower spring shaft rigidly connected to said lower ball; and, a lower spring, said lower spring receivable around said lower spring shaft.

26. The clamping apparatus of claim 24 wherein said upper platen assembly has an upper spring mount with a spherical opening, said second clamp assembly having an inner rear cross member having a spherical opening, said upper spring means comprising:

a first upper ball, said first upper ball receivable within said spherical opening in said upper spring mount;

a second upper ball, said second upper ball receivable within said spherical opening in said inner rear cross member;

a first upper spring shaft, said first upper spring shaft rigidly connected to said first upper ball;

a second upper spring shaft, said second upper spring shaft rigidly connected to said second upper ball, said second upper spring shaft operatively connected to said first upper spring shaft; and, an upper spring, said upper spring receivable around said first and second upper spring shafts.

* * * * *